United States Patent [19]

Noda

[11] Patent Number: 4,932,332
[45] Date of Patent: Jun. 12, 1990

[54] ELECTRONICS ORIENTED DESK
[75] Inventor: Hideo Noda, Tokyo, Japan
[73] Assignee: Mutch Industries, Ltd., Tokyo, Japan
[21] Appl. No.: 396,627
[22] Filed: Aug. 22, 1989
[30] Foreign Application Priority Data Aug. 30, 1988 [JP] Japan .................................. 63-213777

[51] Int. Cl.⁵ ............................................. A47B 35/00
[52] U.S. Cl. ...................................... 108/50; 108/143; 312/196
[58] Field of Search ........................... 108/50, 143, 23; 312/196

[56] References Cited
U.S. PATENT DOCUMENTS 4,193,317 3/1980 Dono et al. ...................... 108/143 X
4,212,842 12/1987 Price et al. ........................... 312/196
4,637,666 1/1987 Worrell et al. .................. 312/196 X
4,729,536 3/1988 Scala ................................. 108/143 X
4,852,500 8/1989 Ryburg et al. ...................... 108/50 X Primary Examiner—Peter A. Aschenbrenner
Attorney, Agent, or Firm—Wenderoth, Lind & Ponack

[57] ABSTRACT

An electronics oriented desk comprising a board fixed to leg portions, a rail disposed relatively slidable over an upper end and a lower edge of the board in a direction parallel to upper and lower edges and being orthogonal to the upper and lower edges and a scanner disposed over a predetermined range on the rail in opposition to the surface of the board, whereby in case the document is laid on the board, and the rail is shifted relatively in a direction crossing the board manually or by motor drive, the document on the board is produced as the electronic data by the scanner.

1 Claim, 3 Drawing Sheets

ELECTRONICS ORIENTED DESK

BRIEF SUMMARY OF THE INVENTION

This invention relates to an electronics oriented desk in which a scanner is integrally provided on a board.

Heretofore, in office desks, no board that accommodates or incorporates electronic functions of sorts is available in the market.

In case of producing the papers processed on the office desk in electronic data by means of a scanner, an operator is required to bring the paper on the desk to the scanner every time, and to put them into electronic data which have been extremely inconvenient. An object of this invention is to eliminate the foregoing drawbacks.

DESCRIPTION OF THE PREFERRED EMBODIMENT:

The construction of this invention will be described in detail in the following by referring to an embodiment shown in attached drawings.

Figure 2:
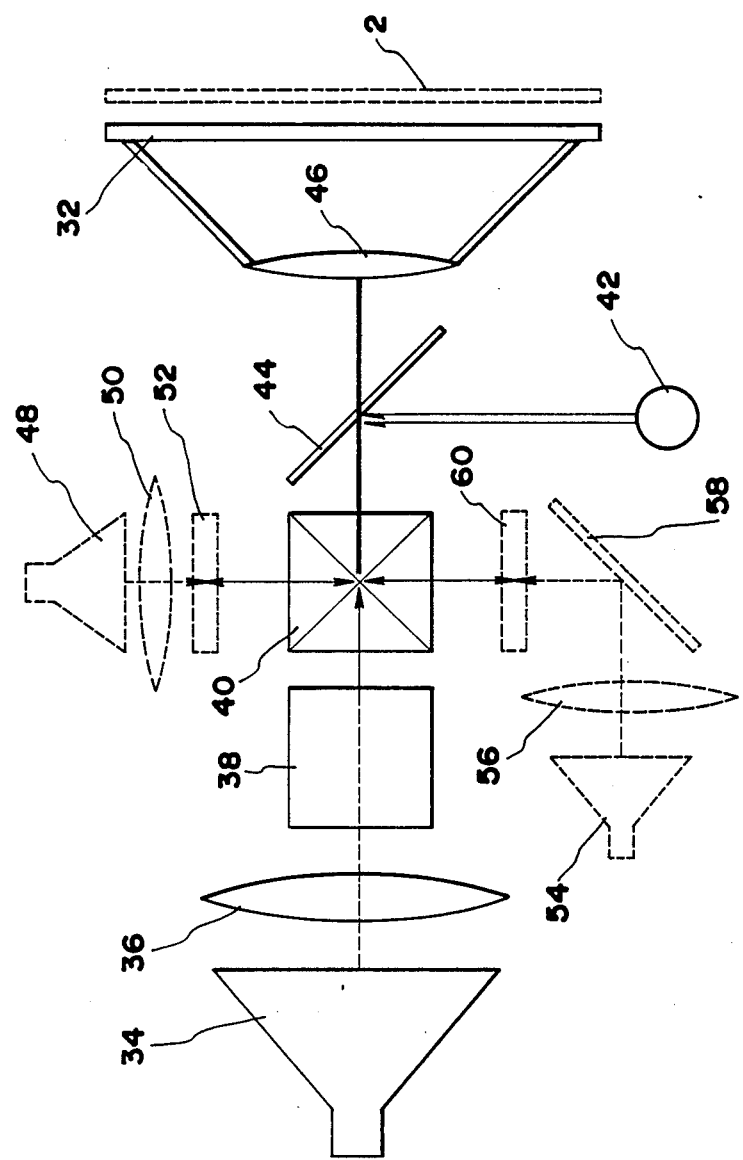
FIG. 2 is an explanatory view.
Figure 3:
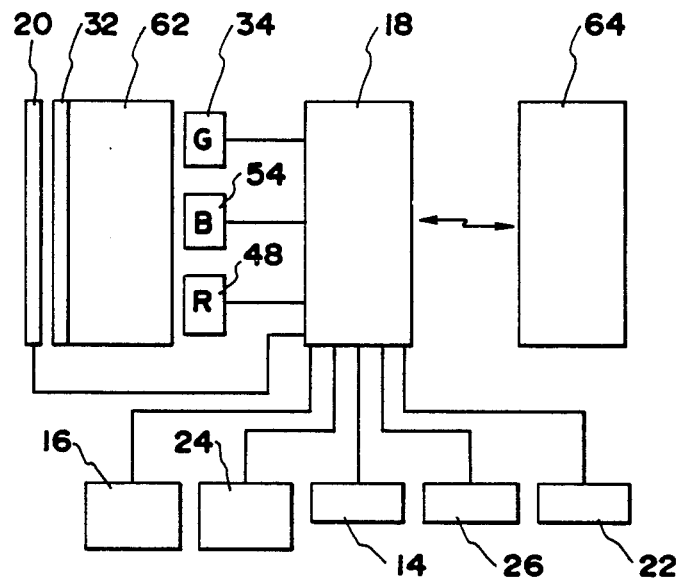
FIG. 3 is a block explanatory drawing.

Reference numeral 2 denotes a box fixed to leg portions 4, and a board 6 is fixed to the box 2, and as a whole, they form an office desk. Lateral rails 8, 10 are fixed to an upper edge and a lower edge of the board 6, and both sides of a rail 12 disposed in right angle to the lateral rails 8, 10 are mounted slidably by means of the lateral rails 8, 10. In the underside of the rail 12, an image scanner 14 is disposed over a range identical with a width in the vertical direction of the board 6 which is opposed to the upper surface of the board 6. A switch panel 16 for operation of the scanner is provided on the upper surface of the rail 12, and each switch of the switch panel is connected to a control unit 18 consisting of a computer having graphic and documental processing function which is disposed in a side desk 17. Reference numeral 20 denotes a transparent digitizer desk disposed in a frame portion formed on the board 6, and is disposed on a plane identical with the plane of the board 6. The digitizer desk 20 is constructed in such a way that when an operator gives an instruction of one point on the digitizer desk with a position indicator such as a free cursor 22 and the like, an output of XY coordinate signal of the designated point is produced by a known theory at the control unit 18. Reference numeral 24 denotes a main panel key for manipulation of the control unit 18, and is disposed on the board 6. Reference numeral 26 denotes a keyboard for manipulation for inputting the data such as letter, symbols and the like to the control unit 18 so that the desired letters or graphics and the like are produced on the digitizer desk 20 by using the keyboard 26, main panel key 24 and the free cursor 22, and also the editing thereof can be made. In FIG. 2, reference numeral 32 denotes a screen of almost identical dimension with that of the digitizer desk 20, and is disposed in the vicinity of the reverse surface side of the digitizer desk 20. Reference numeral 34 denotes a display device consisting of a cathode-ray tube for green (G), and a lens 36, a light bulb 38 and a polarized prism 40 are disposed in the front of the display screen. The light bulb 38 forms a device for converting an image input from one side to a clear image and irradiates it to the other side, and the construction and the principle of the light bulb are disclosed in detail in the official gazettes U.S. Pat. Nos. 3,723,651 and 4,343,535 and the like so that the detailed description thereof is omitted in this text. The foregoing light bulb 38 converts and image of a display device 34 to a clear image by a mutual action of the input light from a xenon lamp 42, and this image is irradiated on a polarized prism 40. The image irradiate by the polarized prism 40 is enlarged and projected on the screen 32 through a half mirror 44 and a projection lens 46. Reference numeral 48 denotes a display device consisting of a cathode-ray tube for red (R), and a lens 50 and a light bulb 52 are disposed in the front of the display screen thereof, and the light bulb 52 is opposed to the polarized prism 40. Reference numeral 54 denotes a display device consisting of a cathode-ray tube for blue (B), and a lens 56, reflection mirror 58 and light bulb 60 are disposed in the front of the display screen, and the light bulb 60 is opposed to the polarized prism 40. The lenses 36, 50, 56, light bulbs 38, 52, 60 and lamp 42, polarized prism 40 and half mirror 44 and reflection mirror 58 form a reflection type enlarging and projecting mechanism 62 that enlarges and projects the image on the display screen of the display devices 34, 48 and 54 on the screen 32, and the rate of magnification of the enlarging and projecting mechanism 62 is set so that the position on the digitizer desk 20 and the position corresponding to the foregoing position on the projection chart on the screen 32 based on the drawing forming coordinate signal of the position coincide with each other. The display devices 34, 48, 54 and the screen 32 and the enlarging and projecting mechanism 62 are accommodated in the box 2.

Next, the operation of this embodiment will be described.

Figure 1:
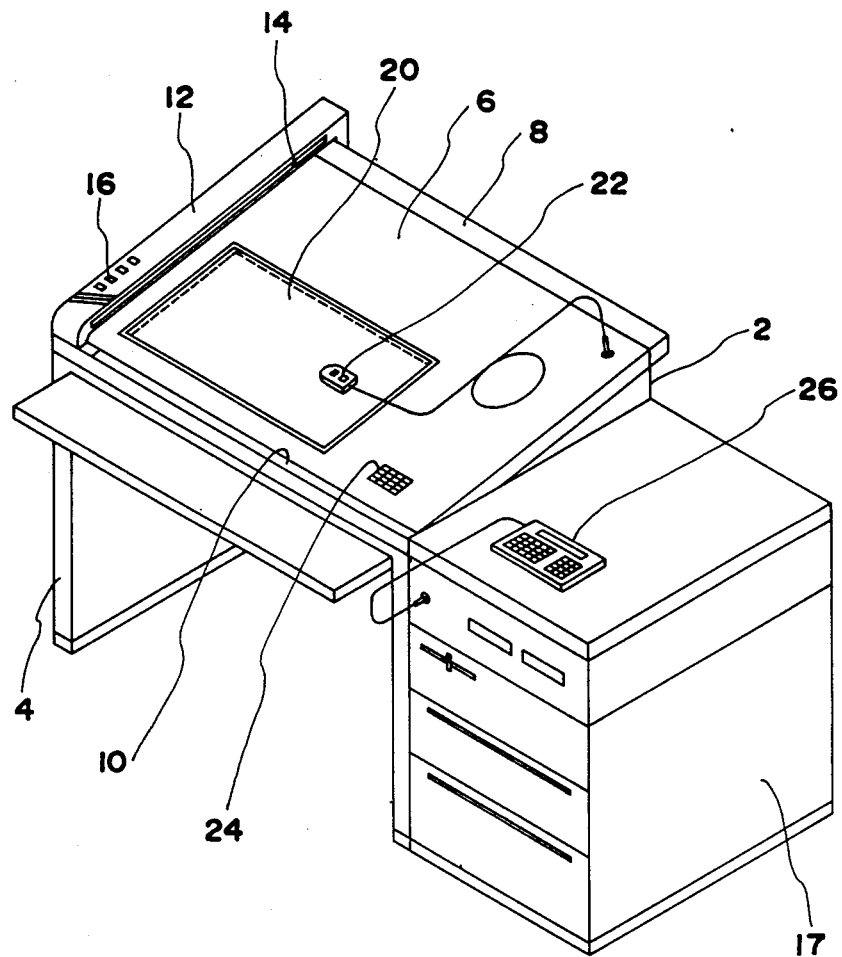
FIG. 1 is an exterior view.

The manuscript on the board 6 is electronically inputted by shifting the rail 12 manually from left to right in FIG. 1 along the surface of the board 6 and scanning the board 6 by the image scanner 14. This electronic data is inputted to the control unit 18, and is stored in the external memory device 68. The letter, graphic data stored in the memory device are displayed on the digitizer desk 20 so that the correction may be made. In this case, the data is displayed on the display device 34. The image on the display screen of the display device 34 is irradiated in the direction of the polarized prism 40 by the light bulb 38, and the image of the display device 34 is enlarged and projected on the screen 32 through the polarized prism 40, half mirror 44 and lens 46. The XY coordinate standard of the enlarged projected chart and the XY coordinate standard of the digitizer desk 4 are 1:1 which are of coincidence. When the operator manipulates the command switch of the main panel key 24 connected to the control unit 18 by means of a cord and gives an instruction of, for example, a green linear command to the control unit 18, and indicating two points A, B on the digitizer desk 20 by a free cursor 22, the coordinate signal of the two points A and B was inputted to the control unit 18. The control unit 18 controls the display device 34 on the basis of the input coordinate signal. By this arrangement the straight line AB is displayed on the display screen of the display device 34 as the XY coordinate axes of the image screen being the standard. The image of the display screen of the display device 34 is displayed on the digitizer desk 20 at a real time by the foregoing principle, and thus, the correction of the graphic or the addition, deletion of the letters and the like on the digitizer desk 20 can be made. Of course, the partial deletion of the displayed graphic on the digitizer desk 20 may be carried out on the basis of the soft built in the control unit 18.

Figure 4:
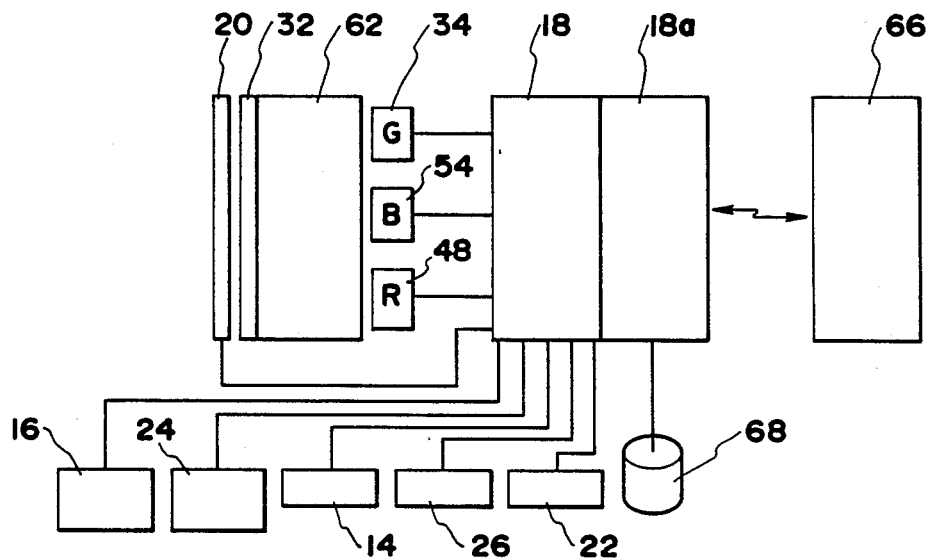
FIG. 4 is a block explanatory drawing.

The foregoing description relates to the case of display and correction by using the green straight line but the preparation of the graphics of the straight line of red, blue and the like or the circle or dot and the like at the position designated on the digitizer desk 20. The data input in the control unit 18 may be processed by the separate computer system 64 connected to the control unit 18, but as shown in FIG. 4, the construction is formed so that the data is stored in the processing equipment 18a of the control unit 18 and the output is produced at the XY plotter. By the way, as the linear graphic information inputting method to the digitizer desk 20, a method of indicating both ends of the linear components with the free cursor 22 as shown in the embodiment and a method of inputting the linear line by the light pen on the digitizer desk 20 may be considered. Also, the construction may be made to perform the scanning operation by shifting the board rather than the shifting of the rail. [Effect].

This invention, as described in the foregoing, has an effect of improving the office efficiency as it is capable of inputting the document prepared on the desk of the foregoing construction into the memory device by means of the scanner on the spot.

What is claimed is:

1. An electronics oriented desk comprising a board fixed to leg portions, a rail disposed relatively slidable over an upper end and a lower edge of the board in a direction parallel to upper and lower edges and being orthogonal to the upper and lower edges, and a scanner disposed over a predetermined range on the rail in opposition to the surface of the board.

* * * * *